(12) United States Patent
Wolf et al.

(10) Patent No.: US 7,357,820 B2
(45) Date of Patent: *Apr. 15, 2008

(54) SYSTEM FOR CONVERTING FUEL AND AIR INTO REFORMATE

(75) Inventors: Felix Wolf, Augsburg (DE); Bernd Mittmann, Germering (DE); Christine Sallinger, Unterschleissheim (DE); Christian Hubbauer, Neuburg (DE); Thomas Kerscher, Munich (DE); Christian Baecker, Fuerstenfeldbruck (DE); Stefan Kunz, Stockdorf (DE); Marcus Neumueller, Hechendorf (DE); Florian Metz, Mering (DE); Martin Wegner, Neubrandenburg (DE); Ingrid Lanzl, Munich (DE); Peter Lamp, Kaufering (DE)

(73) Assignee: Webasto AG, Stockdorf (DE)

( * ) Notice: Subject to any disclaimer, the term of this patent is extended or adjusted under 35 U.S.C. 154(b) by 558 days.

This patent is subject to a terminal disclaimer.

(21) Appl. No.: 10/468,450

(22) PCT Filed: Sep. 27, 2001

(86) PCT No.: PCT/EP01/11216

§ 371 (c)(1),
(2), (4) Date: Aug. 20, 2003

(87) PCT Pub. No.: WO03/022422

PCT Pub. Date: Mar. 20, 2003

(65) Prior Publication Data
US 2004/0068934 A1  Apr. 15, 2004

(30) Foreign Application Priority Data

| Sep. 5, 2001 | (DE) | ................. 101 43 461 |
| Sep. 10, 2001 | (DE) | ................. 101 44 400 |
| Sep. 10, 2001 | (DE) | ................. 101 44 407 |
| Sep. 10, 2001 | (DE) | ................. 101 44 408 |

(51) Int. Cl.
*C01B 3/32* (2006.01)
*B01D 50/00* (2006.01)

(52) U.S. Cl. .................. 48/127.3; 48/127.9; 48/197 R; 96/275; 96/304; 96/366; 261/115; 261/121.3

(58) Field of Classification Search .................... 48/61, 48/127.9, 127.3, 197 R; 422/224–228; 431/7; 252/373; 366/174–175; 96/275, 304, 366; 261/115, 121.3

See application file for complete search history.

(56) References Cited

U.S. PATENT DOCUMENTS

| 4,125,359 A | 11/1978 | Lempa |
| 4,396,372 A | 8/1983 | Matumoto et al. |

(Continued)

FOREIGN PATENT DOCUMENTS

EP  0 777 084  6/1997

(Continued)

*Primary Examiner*—N. Bhat
(74) *Attorney, Agent, or Firm*—David S. Safran

(57) ABSTRACT

The invention relates to a system for converting fuel and air into reformate with a reformer which has a reaction space, a nozzle for supplying a fuel/air mixture to the reaction space, and a fuel feed for supplying fuel to the nozzle. In the invention, the air inlet area of the nozzle is provided with air guidance means which impart a swirl to the in-flowing air.

28 Claims, 9 Drawing Sheets

U.S. PATENT DOCUMENTS

| | | | |
|---|---|---|---|
| 4,651,524 A * | 3/1987 | Brighton | 60/274 |
| 5,899,075 A | 5/1999 | Dean et al. | |
| 5,997,596 A | 12/1999 | Joshi et al. | |
| 6,092,921 A * | 7/2000 | Wentinck et al. | 366/174.1 |
| 6,276,924 B1 | 8/2001 | Joshi et al. | |
| 2003/0143506 A1* | 7/2003 | Hubbauer et al. | 431/351 |

FOREIGN PATENT DOCUMENTS

| | | | |
|---|---|---|---|
| GB | 739699 | * | 5/1954 |
| GB | 739699 | | 11/1955 |
| SU | 1526791 | | 12/1989 |
| WO | WO 98/28493 | | 7/1998 |

* cited by examiner

SYSTEM FOR CONVERTING FUEL AND AIR INTO REFORMATE

BACKGROUND OF THE INVENTION

1. Field of the Invention

The invention relates to a system for converting fuel and air into reformate with a reformer which has a reaction space, a nozzle for supplying a fuel/air mixture to the reaction space, and a fuel feed for supplying fuel to the nozzle. The invention furthermore relates to a process for installing one such system.

2. Description of Related Art

Generic systems are used to convert chemical energy into electrical energy. For this purpose fuel and air, preferably in the form of a fuel/air mixture, are supplied to the reformer. In the reformer, the conversion of the fuel with atmospheric oxygen takes place, preferably via a process of partial oxidation.

The reformate which has been produced according to the invention is supplied to a fuel cell or a stack of fuel cells, with electrical energy being released by the controlled reaction of hydrogen, as a component of the reformate, and oxygen.

The reformer, as already mentioned, can be designed such that the process of partial oxidation is carried out to produce the reformate. In this situation, when using diesel as the fuel it is particularly beneficial to carry out prior reactions before the partial oxidation. Upon using such a process, long-chain diesel molecules can be converted into short-chain molecules with a "cold flame" which ultimately promotes reformer operation. In general, a gas mixture which is reacted to $H_2$ and CO is supplied to the reaction zone of the reformer. Another component of the reformate is $N_2$ from the air, and depending on the air ratio and the temperature, optionally $CO_2$, $H_2O$ and $CH_4$ can also be included. In normal operation, the fuel mass flow is controlled according to the required output, and the air mass flow is adjusted to an air ratio in the range of $\lambda=0.4$. The reforming reaction can be monitored by different sensors, for example, temperature sensors and gas sensors.

In addition to the process of partial oxidation, it is likewise possible to carry out auto-thermal reforming. The process of partial oxidation, in contrast to auto-thermal reforming, is caused by the oxygen being supplied sub-stoichiometrically. For example, the mixture has an air ratio of $\lambda=0.4$. Therefore, since partial oxidation is exothermal, unwanted heating of the reformer can occur in a problematical manner. Furthermore, partial oxidation tends to intensify soot formation. To prevent soot formation, the air ratio $\lambda$ can be chosen to be smaller. This is achieved by making some of the oxygen, used for oxidation, available by water vapor. Since oxidation with water vapor proceeds endothermally, it is possible to adjust the ratio between the fuel, oxygen and water vapor such that overall heat is neither released nor consumed. The auto-thermal reforming achieved in this way eliminates the problem of soot formation and undesirable overheating the reformer.

Similarly, it is possible for further steps of gas treatment to proceed following oxidation in the reformer, and, in particular, methanization can be conducted downstream of partial oxidation.

A current fuel cell system is a PEM system ("proton exchange membrane") which can typically be operated at operating temperatures between room temperature and roughly 100° C. Based on the low operating temperatures, this type of fuel cell is often used for mobile applications, for example in motor vehicles.

Furthermore, high temperature fuel cells are known as SOFC systems ("solid oxide fuel cell"). These systems work in the temperature region of roughly 800° C. with a solid electrolyte ("solid oxide") being able to take over the transport of oxygen ions. The advantage of the high temperature fuel cells over PEM systems is especially in regard to durability relative to mechanical and chemical loads.

Applications for fuel cells can be in conjunction with generic systems which include not only stationary applications, but also applications in the motor vehicle domain, for example as "auxiliary power units" (APU).

For reliable operation of the reformer, it is important to supply the fuel or fuel/air mixture in a suitable manner to the reaction space of the reformer. For example, good mixing of the fuel and air and a good distribution of the fuel/air mixture in the reaction space of the reformer are advantageous for the operation of the reformer. Within the framework of this disclosure, a fuel-air mixture can include substances added or to be added to the reaction space of the reformer. The added substances are not limited, however, to the mixture of fuel and air, but instead other substances can be added, for example water vapor in the case of auto-thermal reforming. To this extent, the concept of fuel/air mixture should be understood in this more general form.

SUMMARY OF THE INVENTION

The object of the invention is to provide a system for the reaction of fuel and air into reformate which has advantageous properties with respect to the introduction of the fuel/air mixture into the reaction space of the reformer.

The invention is based on the general concept in which an air guidance means is provided in the air inlet area of a reformer which imparts a swirl to the in-flowing air. Within the framework of this disclosure the concept of air inlet area should be understood very broadly. On the one hand, for example, a cylindrical part of the flow path can be a Venturi nozzle, but the area outside the Venturi nozzle can also be the air inlet area. What is intended in this disclosure must be understood in this context. By swirling the air entering the nozzle, i.e., in the air entry area, the atomization quality and thus the function of the reformer can be improved. The reason for this is that the air speed is increased due to the pronounced tangential motion component of the air.

An embodiment of the invention which is particularly effective is the provision of an air guidance means which includes an air-guiding device with swirl blades. Such an air-guiding device, as a separate component, can be produced independently of the nozzle and seated on the nozzle.

In this embodiment, the swirl blades are located on a carrier mounted on the nozzle assembly, and two swirl blades together are positioned on the carrier and with the nozzle assembly form a conical channel. The tangential air portion and thus the nozzle air swirl can be set depending on the angular position of these swirl blades to a radial plane. The swirl blades can be located roughly radially or tilted to the radius, and/or the swirl blades can be made flat or curved in the flow direction.

In another embodiment, the air-guiding device can be a pot-shaped sleeve which is attached to the nozzle assembly and can have axial air holes formed in the sleeve and peripheral air holes formed in the peripheral wall of the sleeve. By this construction, it is possible to impart a defined swirl to the air flowing into the nozzle.

In this embodiment, the peripheral air openings can be holes which are formed nearly tangentially to the peripheral wall. The tangential arrangement of the holes makes it possible to impart a swirl to the air without further mechanical aids.

Furthermore, the sleeve can also be provided at the peripheral air openings with air guide blades. It is therefore, unnecessary to directly impart the swirl through the peripheral air holes. Rather it is within the scope of the present invention to permit the air to flow in through peripheral air holes in any manner and then to impart the swirl by air guide blades.

Additionally, the system of the invention can also include as part of the nozzle a Venturi nozzle with an air inlet area and a diffuser area which extends downstream with respect to the air inlet area. One such Venturi nozzle causes a high axial air pressure gradient so that combustion air can be taken in and mixed with fuel in the diffuser area. In the air inlet area or in the area in which the fuel is supplied to the nozzle, the air flowing into the nozzle has a high speed and an accordingly low pressure. The high flow velocity of the air promotes absorption of the fuel by the in-flowing air. As the fuel/air mixture subsequently flows through the diffuser area of the Venturi nozzle, a pressure recovery occurs so that the mixture can flow into the combustion space of the reformer with sufficient pressure. Furthermore, in the diffuser area advantageous mixing of fuel and air takes place. Thus an effective and economical process is created for delivering the fuel/air mixture into the reformer. The installation cost and production costs can be optimized by the choice of different embodiments. For example, it is possible to form at least part of the diffuser area in a single piece with the reformer or the reformer housing or the housing of the reaction space, but it is also within the scope of the present invention to make and use the nozzle as a wholly independent structure from the reformer.

In another embodiment of the invention, the diffuser can be provided with an opening angle which is variable. However, even when, in the simplest case, the diffuser area has a uniform opening angle, the structure can be useful for linking the diffuser part to the reaction space to provide a larger opening angle in the entry area into the combustion chamber. This supports the uniform distribution of the fuel/air mixture in the reaction space; while the opening angle of the part of the diffuser area which is further upstream can be optimized with respect to the flow behavior in that area.

Another particularly advantageous embodiment of the system invention is by supplying the liquid fuel to the Venturi nozzle in the vicinity of the air inlet area through a needle. This fuel needle is supplied with fuel via a fuel line. Based on the high flow velocity of the in-flowing air, the fuel emerging from the fuel needle is almost unpressurized and is pulled into filaments which then break down into droplets. The high air speeds which are necessary for good atomization in the air inlet area can be achieved as a result of the pressure recovery in the diffuser.

Similarly, still another embodiment of the invention can include a system in which the fuel feed includes a pipe and a binary fuel nozzle for supplying the fuel/air mixture to the Venturi nozzle. Therefore, before the fuel enters the Venturi nozzle mixing of the fuel with the air is already taking place which can provide for reliable mixing.

In this embodiment, the fuel feed can be provided as a binary nozzle which is another Venturi nozzle. That is, within the Venturi nozzle, which is used within the framework of the invention and which can also be called a Venturi tube, there is a smaller Venturi nozzle with a fuel needle located in the smaller Venturi nozzle. In the smaller Venturi nozzle, emergence of the fuel from the fuel needle and premixing take place immediately, and the fuel/air mixture then enters the Venturi tube, i.e. the Venturi nozzle, of the invention, and is further mixed there before finally entering the reaction space.

In a particularly preferred embodiment, means are provided such that secondary air can flow into the reaction space. The air entering through the Venturi nozzle into the reaction space, i.e. the air present in the fuel/air mixture, is called primary air. The secondary air is advantageously conveyed through secondary air openings in the housing of the reaction space. The division of the air into primary air and secondary air can be useful for preparing a rich, easily ignited mixture at the outlet of the nozzle. This is particularly beneficial in the starting process of the system, since at that point the reformer functions as a type of burner.

The above embodiment of the invention is further enhanced when the fuel feed includes a fuel needle with a ratio of the inside diameter $d_i$ to the outside diameter $d_a$ being expressed as the following:

$$0.7 \leq d_i/d_a < 1.$$

The fuel needle wall is made extremely thin so that at a given fuel throughput, i.e. for a given inside diameter, the outside diameter is as small as possible. This construction ultimately leads to a particularly small flow barrier due to the presence of the needle. The above tolerance range is selected in order that the needle can be produced without major difficulty. This embodiment provides a system in which the principle underlying this invention can be satisfied, that is, the more the ratio of the inside diameter to outside diameter of the fuel needle approaches a value of 1 the less the fuel/air mixture is restricted through the nozzle and provides a small resistance to the combustion air.

Another advantageous embodiment of the invention is provided when the Venturi nozzle is axially symmetrical and the fuel needle is axially aligned. The axial alignment of the fuel needle provides for a low flow resistance for the combustion air. However, if the effort is made to introduce the fuel at a certain angle into the flow area of the Venturi nozzle, it is also possible to tilt the fuel needle against the axis of the Venturi nozzle. In this latter design, the indicated ratio between the inside diameter and the outside diameter contributes to minimization of the flow resistance.

For this embodiment, it can be useful for the exit plane of the liquid fuel from the fuel needle to run perpendicularly to the flow direction of the liquid fuel through the fuel needle. In this construction, axially symmetrical emergence of the fuel from the fuel needle results ignoring gravity.

However, it can also be beneficial for the exit plane of the liquid fuel from the fuel needle to run obliquely to the flow direction of the liquid fuel through the fuel needle. In this embodiment, a preferential direction upon emergence of the fuel from the fuel needle can be implemented without the fuel needle tilting overall against the axis of the Venturi nozzle. Due to the oblique cut of the fuel needle in the exit area an increase of the flow resistance as a result of the tilted fuel needle can be avoided, while emergence of the fuel from the fuel needle, e.g., oriented against the force of gravity, is still possible.

This embodiment can also include an exit opening of the fuel needle which is provided with tips and/or is crenellated. This construction makes it possible for the fuel to be introduced into the fuel chamber with a great radial extension which cannot be achieved in an optimum manner in a structure without such an edge feature at the exit due to constriction effects.

Another embodiment of the invention includes a system in which the air inlet area has an essentially cylindrical part which has a transition to the diffuser area such that the exit opening of the fuel needle is located in the cylindrical part and an axial distance exists between the exit opening of the fuel needle and the transition. This ensures that the liquid fuel which has emerged from the exit opening of the fuel needle is still transported along with the in-flowing air over a certain distance through a region of high flow velocity. This structure provides especially good atomization. In most cases, it is beneficial to place the exit from the fuel needle at the start of the cylindrical part of the air inlet area of the Venturi nozzle such that essentially the entire cylindrical area is available for good distribution of the atomized fuel in the rapidly flowing combustion air.

Additionally, another embodiment of the invention includes at least one installation of the reformer in a motor vehicle wherein the opening of the fuel needle is located above the axis of the Venturi nozzle. This embodiment makes it possible to arrange the fuel needle parallel to the axis of the Venturi nozzle and at the same time counteract the effect of gravity. If the installation position of the fuel needle is chosen with respect to the axis of the Venturi nozzle to be positioned relative to the reformer such that it is radially offset upward from the axis and then in the peripheral direction, two installation positions of the reformer can be provided. Each of the two installation positions provide favorable equalization of the force of gravity by the location of the opening above the axis of the Venturi nozzle.

The embodiments of the invention can further include a nozzle composed of ceramic material and can include the air guidance means being made in a single piece with the nozzle. In this construction, a nozzle can be economically produced. That is, the ceramic material can be easily machined, and numerous shaping variations are also possible. In particular, the air guidance means which imparts a swirl to the air outside the air inlet area can be constructed in a single piece with the nozzle. As an additional advantage of using a ceramic, the area of the nozzle in which the fuel needle is located is not subjected to overly high temperatures such that ignition of the of fuel emerging form the nozzle does not occur. The one-piece execution of the air guidance means makes it possible to easily adhere to tolerances since miscalibration of the air guidance means is no longer a factor when the reformer is assembled.

Still another advantageous embodiment of the invention includes a system where the nozzle has means for holding a glow pin. The positioning of the glow pin with respect to the nozzle is an important parameter with respect to good starting behavior of the reformer. In heaters of the prior art, the glow pin was generally held by the reformer housing such that positioning fluctuations occur with respect to the nozzle. These tolerance problems can be eliminated by a nozzle that includes means for holding the glow pin. The glow pin always has the same position relative to the nozzle.

In this embodiment, the nozzle of the invention is provided with at least a partial cylindrical shape and is provided with air guidance means which forms channels offset with respect to the radial direction. The air flowing perpendicular to the axis of the nozzle is therefore not only radially supplied, but is provided at an offset. This offset determines the swirl imparted to the air, and thus determines the flow behavior and ultimately the quality of the combustion.

In a preferred embodiment, the air guidance means is constructed to have essentially triangular base surfaces with the corners being rounded. In this embodiment, the channel offset can be easily implemented. The rounding of the corners is also advantageous for uniform flow behavior.

In another preferred embodiment of this invention, the means for holding the glow pin is a hole which is slanted relative to the cylinder axis. The glow pin can then be simply introduced into the hole for suitable positioning. A stop on the glow pin and/or within the hole enables the glow pin to be guided into its optimum position with respect to the nozzle.

The nozzle of the invention can further include an at least essentially cylindrical part of the nozzle having an essentially cylindrical shoulder with an enlarged diameter and can include, as a means of holding the glow pin, a hole which penetrates the shoulder and which is slanted relative to the cylinder axis. In this embodiment, the glow pin can be held in the area such that it influences, as little as possible, the flow behavior of the in-flowing fuel-air mixture. With a cylindrical shoulder having a larger diameter than the remaining nozzle body, this feature can be easily implemented.

In a variation of this embodiment, the at least essentially cylindrical part of the nozzle has an essentially cylindrical shoulder with an enlarged diameter and the cylindrical shoulder has recesses for the holding of mounting pins. These mounting pins can be permanently mounted on the heat shield of the reformer. The relative positioning of the nozzle is fixed in this embodiment by recesses in the shoulder and the position of the mounting pins. Thus mounting is easily achieved with precise tolerances.

In another preferred embodiment, the system of the invention can include a structure in which the reformer, the nozzle and the fuel feed are located on a single axis, and that means are provided for holding the nozzle and the fuel feed, such as via at least two axially aligned mounting pins mounted on the reformer. Additionally, the nozzle and the fuel feed can include positioning means which interact with the mounting pins such that the means for holding the components interact with the mounting pins, and the reformer, the nozzle, the fuel feed and the means for holding the components are successively axially positioned. In this embodiment, all positions of the components are oriented relative to the mounting pins so that precise tolerances can be maintained. The fuel needle is also positioned very accurately with respect to the nozzle. Furthermore, the positioning of the glow pin, required for starting, is dictated by the positions of the mounting pins. As a result, a stable structure is achieved which ensures reformer operation with great efficiency.

Another embodiment of the invention includes a system in which the means for holding the components includes a spring which is held on the mounting pin by clamp disks. Attachment with one such spring has the advantage that mechanical stresses, especially as a result of temperature effects, can be equalized. In systems of the prior art, undesirably high forces can act on the reformer and on an optional heat shield of the reformer due these mechanical stresses, which can result in deformation of the reformer.

In still another embodiment of the invention, the mounting pins are welded onto the reformer. In this embodiment, the mounting pins are securely connected to the reformer in a defined position with respect to the latter.

In still another embodiment of the invention, between the nozzle and the reformer is provided a seal. The seal provides both thermal insulation and for matching of the nozzle to the heat shield of the reformer.

In this embodiment, the seal can be provided with at least one mica layer facing the reformer and at least one graphite layer facing the nozzle. This structure ensure that the advantageous properties of the seal are realized in a reliable manner.

In still another embodiment of the invention, the fuel feed is knitted metal mesh. This structure breaks down bubbles in the fuel. Additionally, a counter-pressure for a damper, which is optionally located on the fuel line, is made available.

Another embodiment of the invention, includes a process for installing a system for conversion of fuel and air into reformate. The process include a system having at least two mounting pins in which a nozzle is guided in the axial direction onto the mounting pins, a fuel feed is guided in the axial direction onto the mounting pins, and a means is provided for holding the components which are guided in the axial direction on the mounting pins. This process can be implemented particularly easily since all components are supplied in the axial direction. Additionally, the process can be automated such that large numbers of reformer assemblies can be produced within a short time.

In still another embodiment of the invention, the process can include the step, before guiding the nozzle onto the mounting pins, of providing a seal which is guided in the axial direction onto the mounting pins. A device with a seal can thus be easily integrated into the process since the seal is also guided in the axial direction onto the mounting pins.

In still another embodiment of the invention, the assembly process includes a means for holding the components which is a spring such that the spring is guided in a force-controlled manner onto the mounting pins. The spring cooperates with clamp disks which fix the spring in its assembled position.

With this embodiment, within a single assembly uniform tolerances can be established with respect to heat and temperature properties of the assembly. The spring force imparted by the spring ensures that the loss of tolerances, as a result of different heating of the components, different final temperatures of components and different coefficients of temperature expansion, can be reduced. That is, the tolerances can be equalized.

The present invention is based upon the determination that major advantages are realized in the use of a Venturi nozzle to introduce the fuel/air mixture into the reformer. A Venturi nozzle offers the advantage of the liquid fuel being taken up efficiently in areas of high flow velocity into the in-flowing air. Subsequently, a sufficient pressure build-up is ensured when introducing the fuel/air mixture into the reformer. A Venturi nozzle can be economically produced in each of the numerous embodiments. Furthermore, installation processes for each of the embodiments of the invention are particularly efficient.

BRIEF DESCRIPTION OF THE DRAWINGS

The invention is explained by way of example with reference to the attached drawings.

DETAILED DESCRIPTION OF THE INVENTION

Figure 1:
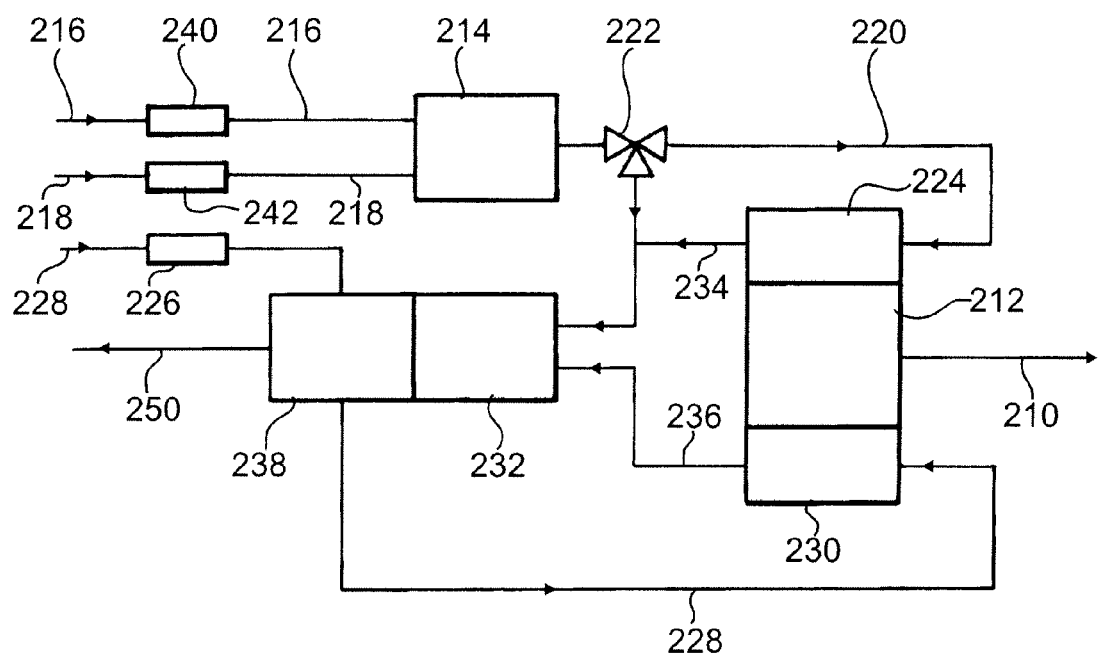
FIG. 1 shows a schematic block diagram of a system in which an embodiment of the invention can be used.

FIG. 1 shows a schematic block diagram of a system in which this invention can be used. Fuel 216 is supplied to a reformer 214 via a pump 240. Furthermore, air 218 is supplied to the reformer 214 via a fan 242. The reformate 220 produced in the reformer 214 travels via a valve means 222 to the anode 224 of a fuel cell 212. The cathode 230 of the fuel cell 212 is supplied with cathode feed air 228 via a fan 226. The fuel cell 212 produces electrical energy 210. The anode exhaust gas 234 and the cathode exhaust air 236 are supplied to the burner 232. Likewise, reformate can be supplied to the burner 232 via the valve means 222. The thermal energy produced in the burner 232 can be supplied in a heat exchanger 238 to the cathode feed air 228 so that it is preheated. Exhaust gas 250 flows out of the heat exchanger 238.

The system shown in conjunction with the figures described below can be used to supply a fuel/air mixture to the reformer 214.

Figure 2:
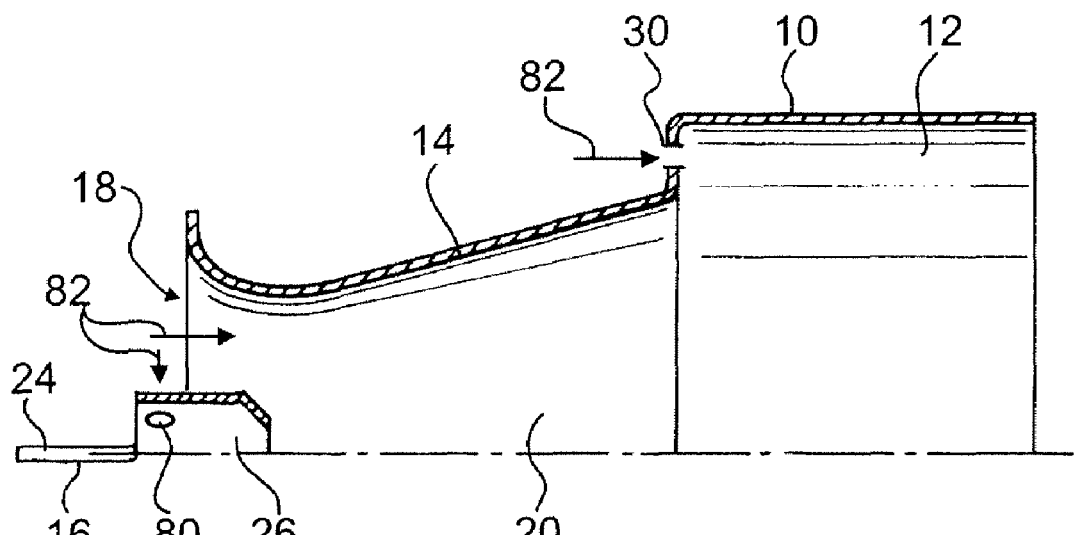
FIG. 2 shows a schematic sectional view of one embodiment of the invention.

FIG. 2 shows a schematic sectional view of one embodiment of the system of the invention. The system comprises a reformer 10 with a reaction space 12. A Venturi nozzle 14 is connected to the reformer 10. The nozzle has an air inlet area 18 and a diffuser 20 with a cross section which increases in the direction to the reformer 10. Within the Venturi nozzle 14 in the vicinity of the air inlet area 18 there is a fuel feed 16. The fuel feed 16 comprises a pipe 24 for the feed of fuel and a binary nozzle 26. The binary nozzle 26 is provided with an opening 80 into which air 82 can flow. The air is mixed within the binary nozzle 26 with fuel supplied by the pipe 24. From the downstream opening of the binary nozzle 26, a fuel/air mixture can emerge which is entrained by the air 82 which enters the air inlet area 18 of the Venturi nozzle 14. The fuel/air mixture mixes with the air 82 which has flowed into the air inlet area 18 of the Venturi nozzle 14, and the resulting fuel/air mixture travels via the diffuser 20 into the reaction space 12 of the reformer 10. Furthermore, an opening 30 to the reaction space 12 of the reformer 10 can be provided through which secondary air 82 can enter the reaction space 12.

Figure 3:
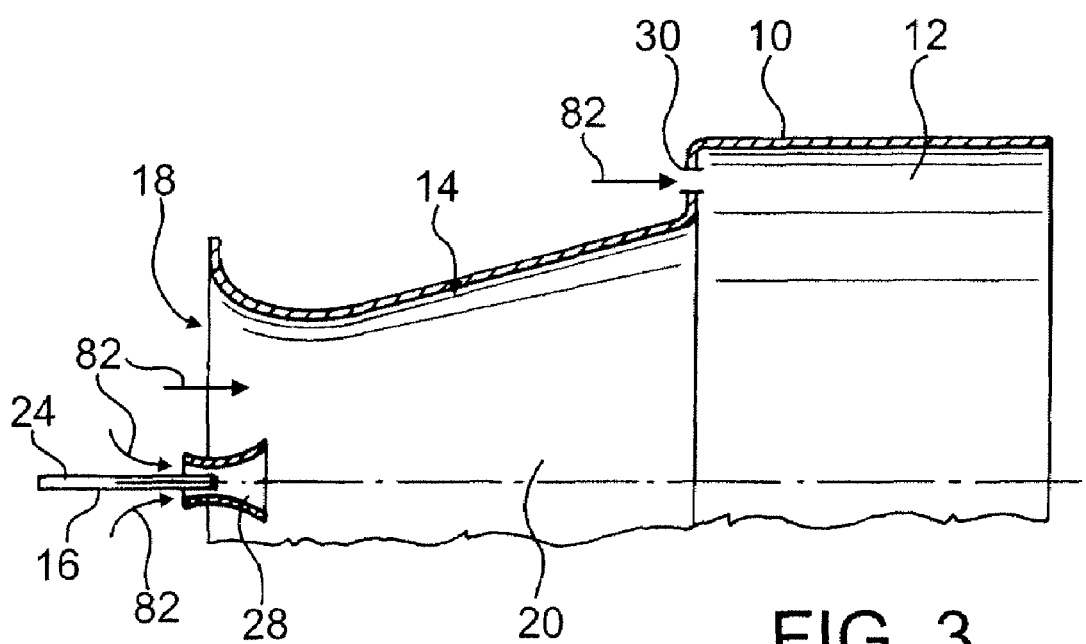
FIG. 3 shows a schematic sectional view of another embodiment of the invention.

FIG. 3 shows a schematic sectional view of another embodiment of the system of the invention. The fuel feed 16 in the system shown in FIG. 3 is different from in the system shown in FIG. 2. The fuel is first supplied in turn via a pipe 24, but then travels into another Venturi nozzle 28 which is much smaller than the Venturi nozzle 14. In the Venturi nozzle 28 the liquid fuel is picked up and atomized by the air 82 which is flowing past the exit opening of the pipe 24 at high speed. The resulting fuel/air mixture is then entrained by the air 82 which flows in the air inlet area 18 of the Venturi nozzle 14 so that it can mix with it.

Figure 4:
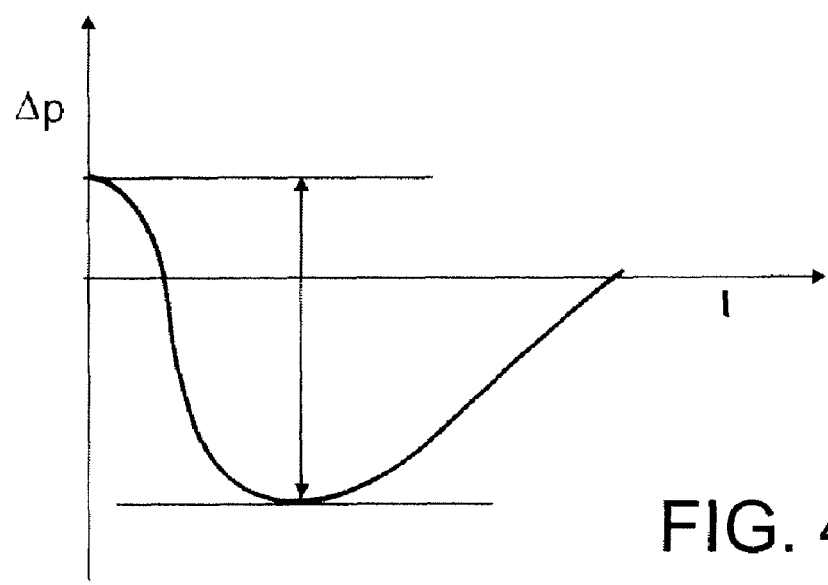
FIG. 4 is a diagram which illustrates the axial pressure behavior in the Venturi nozzle.

FIG. 4 is a diagram which illustrates the axial pressure distribution in a Venturi nozzle. The pressure difference $\Delta p$ between the pressure at a certain coordinate and the pressure in the reaction space 12 (see FIGS. 2 and 3) is plotted. The air 82 is generally fed into the air inlet region 18 of the Venturi nozzle 14 by a fan (not shown), this air being made available with only a low overpressure. As a result of the speed increase of the in-flowing air the pressure drops to a minimum value. As the air continues to flow through the diffuser of the Venturi nozzle, the flow velocity decreases again and the pressure increases gradually to the reaction chamber pressure.

Figure 5:
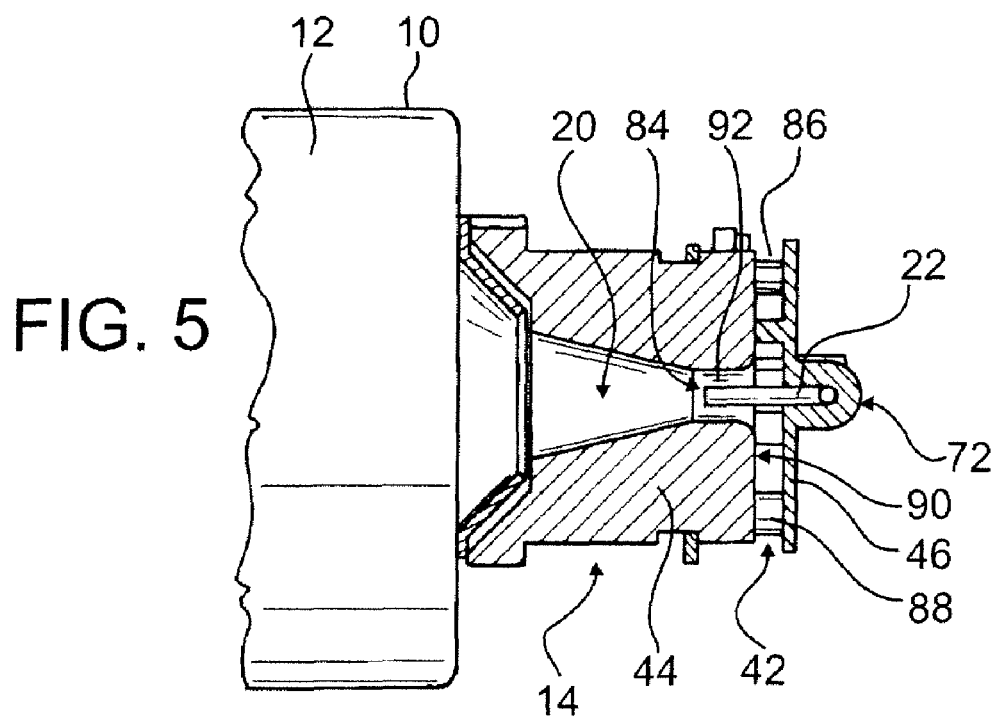
FIG. 5 shows a schematic sectional view of another embodiment of the invention.

FIG. 5 shows a schematic sectional view of another embodiment of a system of the invention. The system comprises a Venturi nozzle 14 with a nozzle assembly 44. Furthermore, there is a fuel feed 72 for supplying liquid fuel to the nozzle 14. The fuel is supplied to the air inflow area 92 via the fuel exit 84 of the fuel needle 22, is entrained by the in-flowing air and then travels as a fuel/air mixture to the reaction space 12 of the reformer 10 via the diffuser 20. The nozzle assembly 44 is connected downstream of an air-guiding device 42 which impresses a swirl on the air flowing into the Venturi nozzle 14. The air-guiding device 42 is a carrier 46 which is located at a distance opposite the end face 90 of the nozzle assembly 44, and is for example circular. The air-guiding device 42 forms an annular gap 86 together with the end face 90 of the nozzle assembly 44. On the carrier 46 there are swirl blades 88 which are pointed against the end face 90 of the nozzle assembly 44 and adjoin it in the assembled position.

Figure 6:
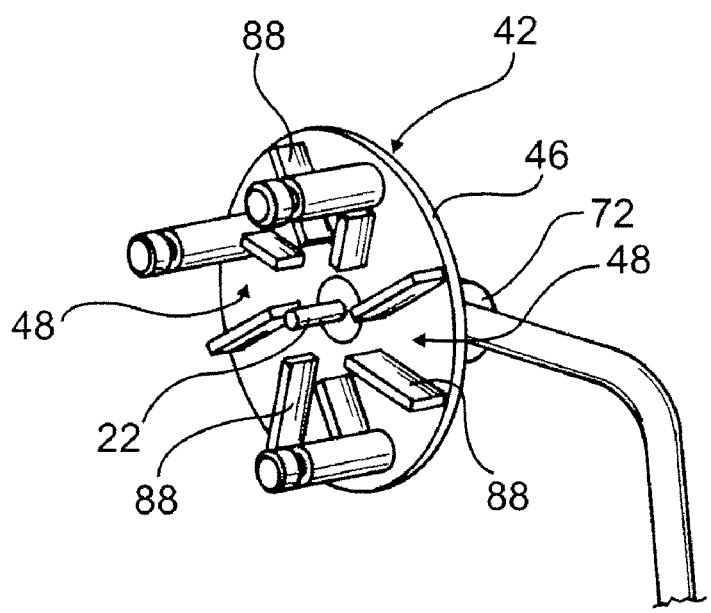
FIG. 6 shows a perspective of a carrier with an air-guiding device for use in an embodiment of the invention.

FIG. 6 shows a perspective view of an air-guiding device 42 for use in a system of the invention. The swirl blades 88 are arranged offset on a carrier 46 with respect to the radius of the circular arrangement in order to produce a tangential flow component. Two swirl blades 88 cooperate with the carrier 46 and the nozzle assembly 44 form a conical channel 48.

Figure 7:
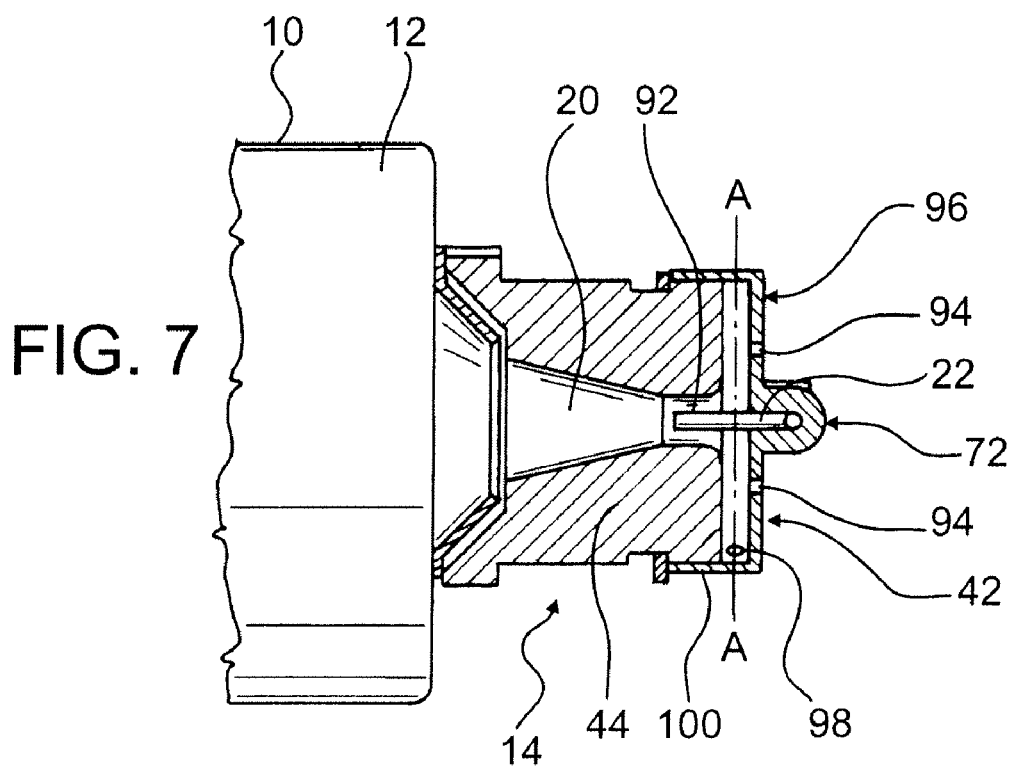
FIG. 7 shows schematic sectional view of another embodiment of the invention.

FIG. 7 shows a schematic cross sectional view of another embodiment of a system of the invention. This embodiment of the system of the invention differs from that shown in FIG. 5 in that the air-guiding device 42 is made as a pot-shaped sleeve 96. The sleeve 96 in its bottom has axial holes 94, and in the peripheral wall 100 of the sleeve 96 tangential holes 98 are formed. The sleeve 96 is attached to the nozzle assembly of the Venturi nozzle 14, for example by slipping it on or by some other form of positive, non-positive or material connection. The axial holes 94 and the tangential holes 98 are matched to one another such that a defined swirl is imparted to the in-flowing air.

Figure 8:
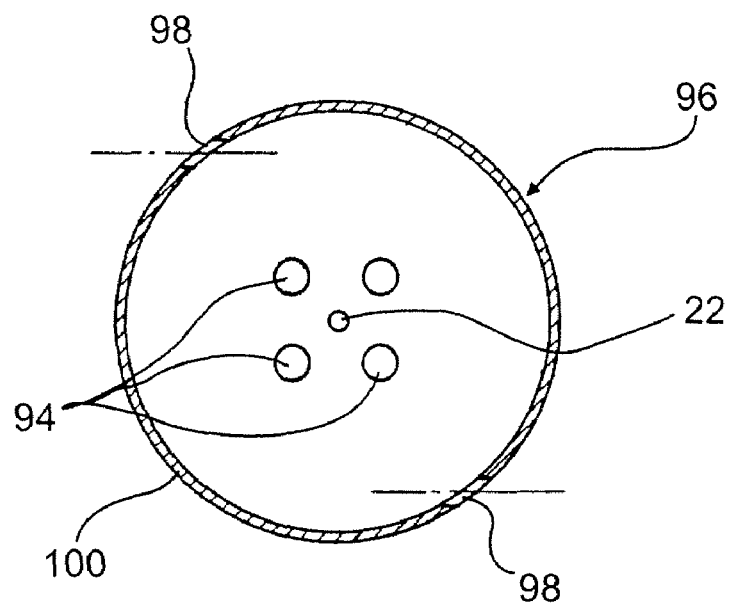
FIG. 8 shows a schematic sectional view along the cross sectional plane identified by A-A in FIG. 7.

FIG. 8 shows a schematic sectional view along the cross sectional plane identified by A-A in FIG. 7. A sample arrangement of the axial holes 94 and the tangential holes 98 in the sleeve 96 is illustrated. By varying the number, size and arrangement of openings or holes 94, 98, the swirl of the air flow can be adjusted if desired.

Figure 9:
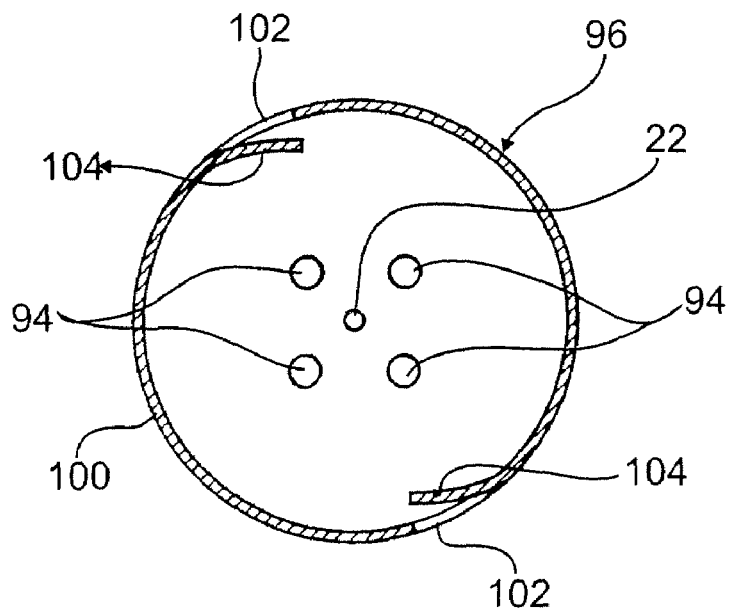
FIG. 9 shows a schematic sectional view, corresponding to the section as shown in FIG. 8, of another embodiment of an air-guiding device.

FIG. 9 shows a schematic sectional view, corresponding to FIG. 8, of another embodiment of an air-guiding device. The sleeve 96 has in its peripheral wall 100 air holes 102 which are bounded towards the center of the sleeve 96 by an air guide blade 104 assigned to each respective air opening 102. A tangential flow component is therefore impressed on the in-flowing air by the air guide blades 104.

Figure 10:
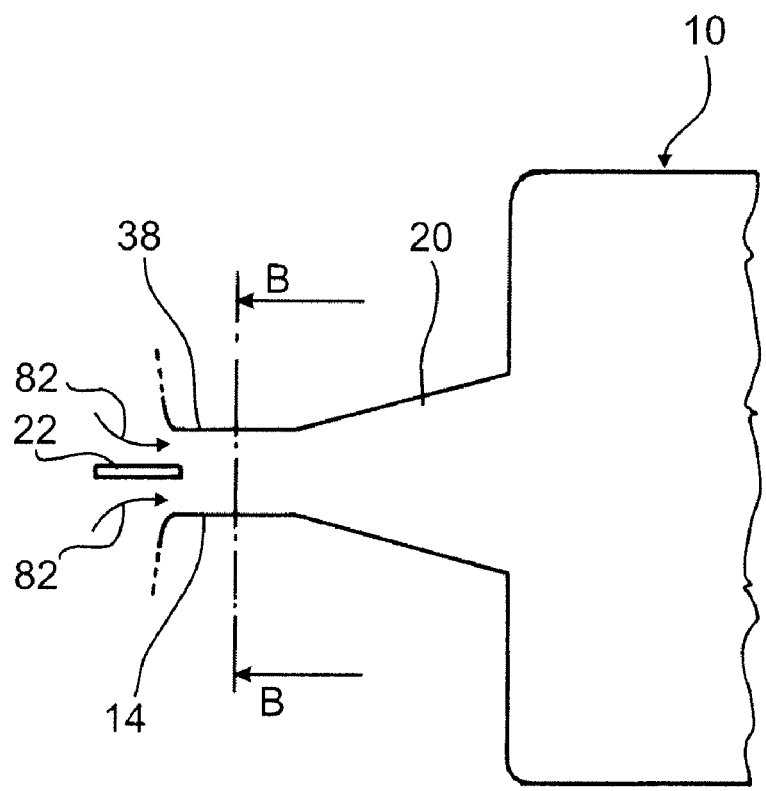
FIG. 10 shows a schematic sectional view of another embodiment of the invention.

FIG. 10 shows a schematic sectional view of another embodiment of a system of the invention. The function and properties of the components shown result from the preceding description with consideration of the reference numbers. The representation is highly schematic so that the important components of the system of the invention can be illustrated. In the cylindrical part 38 of the Venturi nozzle 14 there is a fuel needle 22 for supplying fuel. On the one hand, it is a desirable to arrange the fuel needle 22 in exactly this narrowed cylindrical part 38 of the Venturi nozzle 14, since the combustion air 82 flowing with high flow velocity promotes atomization of the fuel. On the other hand, the fuel needle 22 also represents a flow barrier to the in-flowing combustion air 82. This is a basic problem which is solved by the features described below in conjunction with the system of the invention. Line B-B identifies a radial cutting plane to which reference is made in the following description.

Figure 11:
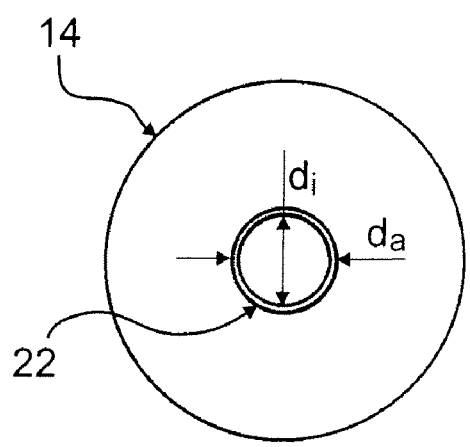
FIG. 11 shows a schematic sectional view along the plane identified by B-B in FIG. 10.

FIG. 11 shows a sectional view along the plane identified in FIG. 10 with B-B. It can be easily recognized that this invention solves the problem described in conjunction with FIG. 10. That is, by choosing the ratio between the inside diameter $d_i$ and the outside diameter $d_a$ of the fuel needle 22 to be as near a value of 1 as possible, the fuel needle 22 represents a minimum flow resistance for the in-flowing combustion air in the Venturi nozzle 14.

Figure 12:
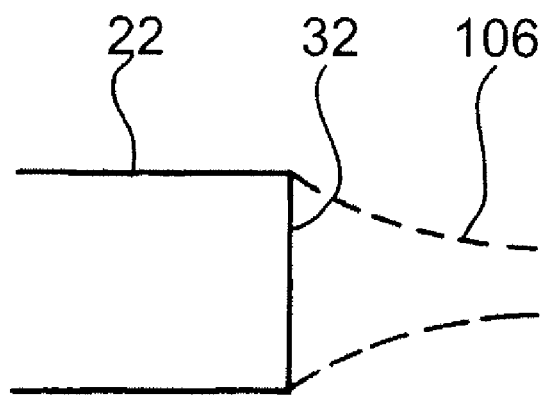
FIG. 12 shows a fuel needle with a first exit opening for use in any embodiment of the invention.

FIG. 12 shows a fuel needle 22 with a first exit opening for use in a system of the invention. In this embodiment, the exit plane 32 of the fuel 106 from the fuel needle 22 is perpendicular to the main flow direction of the fuel 106. This results in constriction of the fuel 106 outside the fuel needle 22 which can be disadvantageous with respect to the uniform distribution of the fuel 106 in the Venturi nozzle and ultimately in the combustion chamber.

Figure 13:
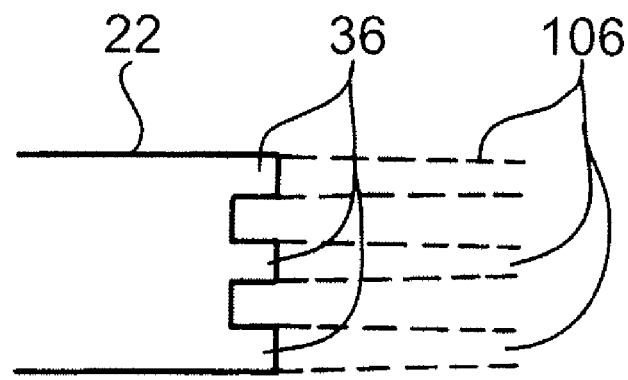
FIG. 13 shows a fuel needle with a second exit opening for use in any embodiment of the invention.

FIG. 13 shows a fuel needle 22 with a second outlet opening for use in a system of the invention. In this embodiment, the exit opening of the fuel needle 22 has crenelations 36. These crenelations 36 concentrate emerging fuel 106 in certain areas and ultimately the result in the fuel 106 being distributed homogeneously over the entire flow cross section.

Figure 14:
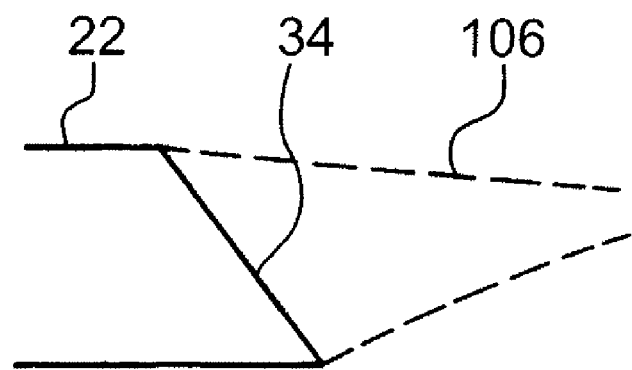
FIG. 14 shows a fuel needle with a third exit opening for use in any embodiment of the invention.

FIG. 14 shows a fuel needle 22 with a third exit opening for use in a system of the invention. In this embodiment, the fuel needle 22 is provided with a beveled opening 34. The beveled opening 34 imparts to the out-flowing fuel 106 a preferential direction so that for example the effect of the force of gravity can be counteracted.

The particular designs of the fuel needles can be combined in any manner with any other embodiments of the invention. For example, it is possible for a slanted exit plane to be combined with a crenellated structure.

Figure 15:
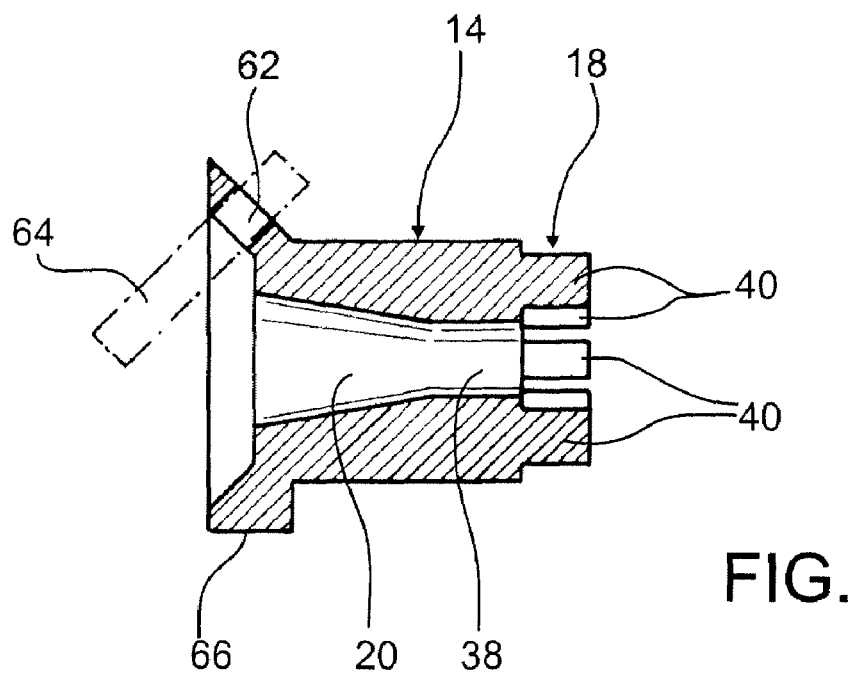
FIG. 15 shows a partially cut side view of a nozzle for use in any embodiment of the invention.

FIG. 15 shows a partially cutaway side view of one embodiment of a nozzle 14 for use in a system of the invention. The Venturi nozzle 14 is made of ceramic material which simplifies the production of the nozzle 14 compared to metal nozzles. In the air inlet area 18, there are air guidance means 40 which are constructed in one piece with the nozzle 14. In particular, the air-guidance means 40 are also made of ceramic material. The air guide means 40 are aligned such that a swirl is imparted to the supplied air the details of which are illustrated below with reference to FIG. 16. The Venturi nozzle 14 is furthermore provided with a hole 62. A glow pin 64 can be inserted into this hole 62 and is used to ignite the fuel/air mixture entering the reaction space which is not shown in FIG. 15. In particular, when the system of the invention starts, the reformer works in the manner of a burner so that initial ignition of the fuel/air mixture is necessary. It is advantageous in an arrangement of the glow pin 64 in a hole 62 of the nozzle 14 that the positioning of the glow pin 64 is fixed with respect to the nozzle 14. Therefore, the positioning of the glow pin 64 does not depend on any other components. In this way, very precise tolerances can be maintained with respect to the installation location of the glow pin 64. The hole 62 advantageously penetrates the cylindrical shoulder 66 of the nozzle 14 with an increased radius which has the advantage that the flow behavior of the nozzle 14 is influenced only little by the hole 62 or by the glow pin 64 which is located in the hole 62.

Figure 16:
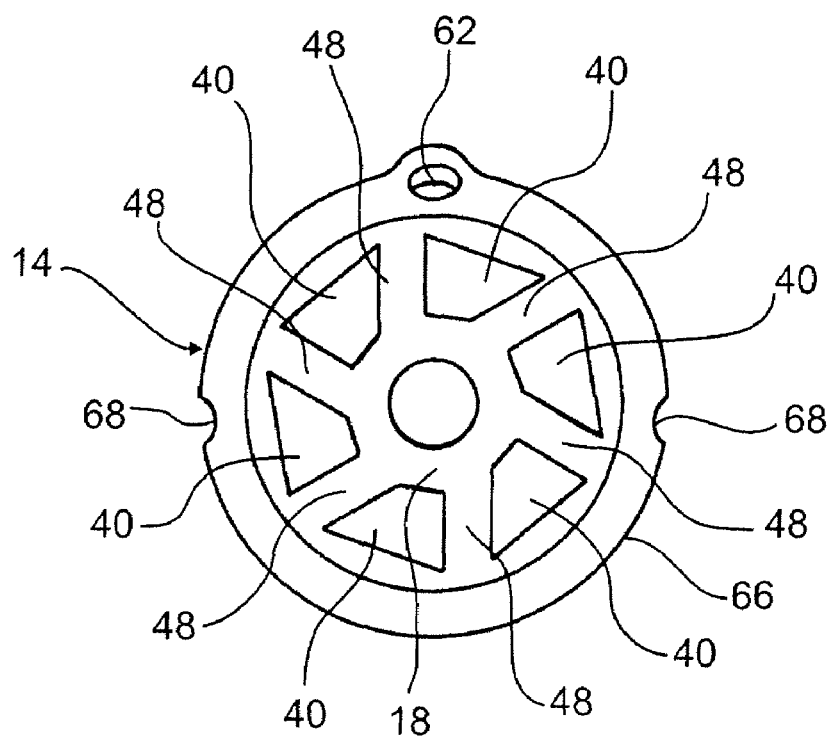
FIG. 16 shows an overhead view of the air inlet area of a nozzle for use in a system as claimed in the invention.

FIG. 16 shows an overhead view of the air inlet area 18 of a nozzle 14 for use in the system of the invention. One possible configuration of the air inlet area 18 by the air guide elements 40 is shown. The air guide elements 40 form channels 48 for the in-flowing air. These channels 48 have an offset position with respect to the radius of the structure located essentially on one axis. Air flowing in from the outside undergoes a swirl which provides for advantageous properties with respect to atomization of the fuel emerging from the fuel needle. Furthermore, in this illustration, the arrangement of the opening 62 for holding the glow pin can be seen as well. The glow pin penetrates an essentially cylindrical shoulder 66. Furthermore, the shoulder 66 is provided with recesses 68 which define the installation position of the nozzle 14 which is detailed below with respect to FIG. 17.

Figure 17:
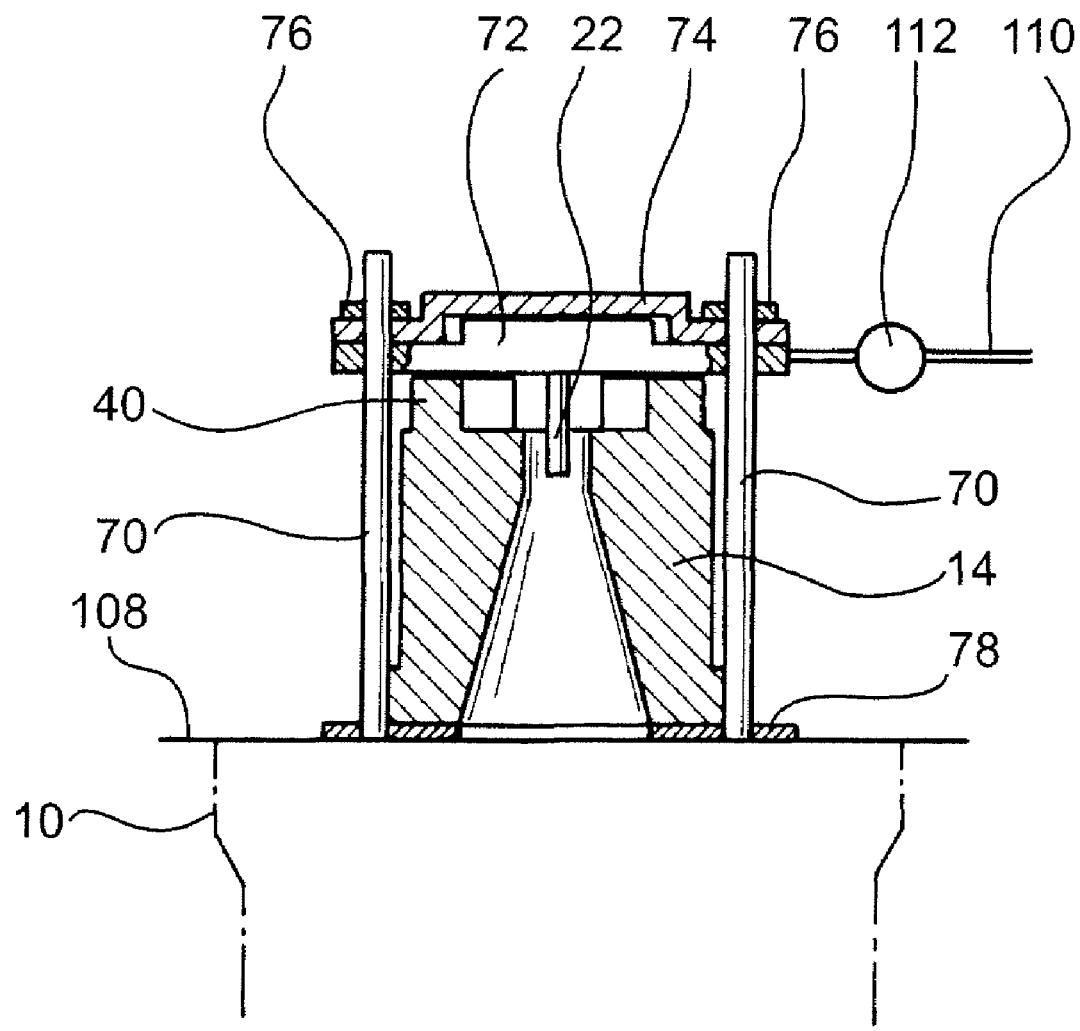
FIG. 17 shows a schematic sectional view of another embodiment of the invention.

FIG. 17 shows a schematic cross sectional view of another embodiment of a system of the invention in which the end of the reformer 10 facing the nozzle 14 is shown. The reformer 10 is bordered by the heat shield 108. On this heat shield 108, there are two mounting pins 80 in this embodiment. The mounting pins 70 can be welded to the heat shield 108 or to the reformer 10. The mounting pins 70 will define the positioning of the other components as described below. Initially, a seal 78, which preferably includes a mica layer turned toward the reformer 10 and a graphite layer turned toward the nozzle 14, is positioned on the mounting pins 70. A ceramic nozzle 14 follows which sits with its recesses 88, shown in FIG. 16, on the mounting pins 70. A fuel feed 72, which is connected to the fuel needle 22, is next seated on the nozzle 14. This fuel feed 72 is also positioned by the mounting pins 70. The fuel feed 72 is supplied with fuel by the fuel line 110 in which the fuel sensor 112 is located. The fuel feed 72 is followed by a spring 74 which is also seated on the mounting pins 70. The spring 74 is held by clamping disks 76 which sit immovably on the mounting pins 70. The spring 74 is shown in the tensioned state in which the legs of the spring 74 are parallel to the interposed disks 76. In the released state of the spring 74 the legs of the spring are bent upward in the direction toward the interposed disks 76. A glow pin (not shown) is positioned in this assembly according to the embodiment of a nozzle 14 shown in FIG. 15 and is held by a wire spring (not shown) which is supported on the nozzle 14.

By this assembly process, the fuel feed 72 and thus the fuel needle 22 are automatically aligned with respect to the nozzle 14. Therefore, only two components are involved which influence the fuel feed and the mixing of the fuel with combustion air so that very small, precise tolerances can be maintained. This type of installation is made possible by the mounting pins 70. Likewise, the glow pin 64 can be positioned exactly with respect to the nozzle 14 and the reformer 10.

The production of the structure shown in FIG. 17 can be fully automated. In particular, since the installation direction is uniformly axial only "threading" of the parts must be carried out. While the seal 78 enables thermal insulation, coupling of the nozzle ceramic 14 to the metal of the heat shield 108 and tolerance equalization to be achieved. The system of the invention can be advantageously mounted by power-controlled pressing of the clamp disks 76 onto the mounting pins 70 such that, with regard to the heat and temperature properties of the system, uniform prerequisites can be established. Furthermore, as a result of the spring force applied by spring 74, the tolerances as a result of different heating of the components, different final temperatures of the components and different coefficients of temperature expansion can be equalized.

The invention claimed is:

1. Device for converting fuel and air into reformate comprising
   a reformer which includes a reaction space,
   a nozzle for supplying a fuel/air mixture to the reaction space, wherein the nozzle is a Venturi nozzle having an air inlet area and a diffuser area which extends downstream with respect to the air inlet area, and
   a fuel feed for supplying fuel to the nozzle,
   wherein the air inlet area of the nozzle includes an air guidance means for imparting a swirl to the flow of air into the nozzle, and
   wherein the nozzle is composed, at least in part, of a ceramic material, and
   wherein the nozzle and air guidance means are integrally formed as a single unit.

2. A device as claimed in claim 1, wherein the diffuser area of the nozzle includes an opening angle which is variable.

3. A device as claimed in claim 1, wherein the fuel feed includes a fuel needle in which the fuel needle is located in the vicinity of the air inlet area.

4. A device as claimed in claim 1, wherein the fuel feed includes a pipe and binary nozzle to supply the Venturi nozzle with a fuel/air mixture.

5. A device as claimed in claim 4, wherein the binary nozzle is another Venturi nozzle.

6. A device as claimed in claim 1, further comprising a means to feed secondary air into the reaction space.

7. A device as claimed in claim 1, wherein the fuel feed includes a fuel needle which is located in the vicinity of the air inlet area, and wherein a ratio of the inside diameter $d_i$ to the outside diameter $d_a$ of the fuel needle is in the range $0.7 \leq d_i/d_a < 1$.

8. A device as claimed in claim 3, wherein the Venturi nozzle is axially symmetrical and the fuel needle is axially aligned with the Venturi nozzle.

9. A device as claimed in claim 3, wherein an exit plane of the liquid fuel from the fuel needle is perpendicular to a flow direction of the liquid fuel through the fuel needle.

10. A device as claimed in claim 3, wherein an exit plane of the liquid fuel from the fuel needle extends obliquely with respect to a flow direction of the liquid fuel through the fuel needle.

11. A device as claimed in claim 3, wherein the fuel needle includes an outlet opening provided with a plurality of tips or crenelations.

12. A device as claimed in claim 1, wherein the air inlet area includes an essentially cylindrical part which has a transition to a diffuser area, and wherein the fuel feed includes a fuel needle having an exit opening located in the cylindrical part such that there is an axial distance between the exit opening of the fuel needle and the transition.

13. A device as claimed in claim 3, wherein the device is to be installed in a motor vehicle and an exit opening of the fuel needle is located above an axis of the Venturi nozzle.

14. A device as claimed in claim 1 wherein the nozzle further includes a means for holding a glow pin.

15. A device as claimed in claim 1, wherein the nozzle has an at least partially cylindrical shape and the air guidance means form channels which are offset with respect to a radius of the nozzle.

16. A device as claimed in claim 1, wherein the air guidance means has an essentially triangularly shaped base surface with the corners of the triangular shaped base surface being rounded.

17. A device as claimed in claim 14, wherein the means for holding the glow pin is a hole which is slanted with respect to an axis of the nozzle.

18. A device as claimed in claim 14, wherein the nozzle is at least partially cylindrical and includes a cylindrical shoulder having an enlarged external diameter wherein the means of holding the glow pin comprises a hole which extend though the cylindrical shoulder and is slanted to the cylinder axis of the nozzle.

19. A device as claimed in claim 1, further comprising mounting pins for holding the reformer, nozzle and fuel feed in alignment, wherein the nozzle is at least partially cylindrical and includes a cylindrical shoulder having an enlarged external diameter and having a plurality of recesses for engaging mounting pins.

20. A device as claimed in claim 19, further comprising a means for holding the nozzle and the fuel feed in an assembled relationship such that the reformer, the nozzle and the fuel feed are located successively on a single axis, wherein there are at least two axially aligned mounting pins which are mounted on the reformer, the nozzle and the fuel feed include positioning means which interact with the mounting pins, and the means for holding the nozzle and the fuel feed interact with the mounting pins.

21. A device as claimed in claim 20, wherein the means for holding the nozzle and the fuel feed includes a spring which is held on the mounting pins by clamp disks.

22. A device as claimed in claim 20, wherein the mounting pins are welded to the reformer.

23. A device as claimed in claim 1, further comprising a seal situated between the nozzle and the reformer.

24. A device as claimed in claim 23, wherein the seal includes at least one mica layer which faces the reformer and at least one graphite layer which faces the nozzle.

25. A device as claimed in claim 1, wherein the fuel feed includes a metal mesh.

26. A process for assembling a system for conversion of fuel and air into reformate including a reformer and at least two mounting pins on the reformer comprising the steps of:

guiding a nozzle in an axial direction onto the mounting pins, wherein the nozzle is a Venturi nozzle having an air inlet area and a diffuser area, which extends downstream with respect to the air inlet area, and wherein the air inlet area of the nozzle includes an air guidance means for imparting a swirl to the flow of air into the nozzle, and wherein the nozzle is composed, at least in part, of a ceramic material, and the nozzle and air guidance means are integrally formed as a single unit, and guiding a fuel feed in the axial direction onto the mounting pins, and assembling on the mounting pins a means for holding the nozzle and fuel feed in an assembled condition in the axial direction on the mounting pins.

27. The process as claimed in claim 26, wherein prior to guiding the nozzle on the mounting pins a seal is guided in the axial direction onto the mounting pins.

28. The process as claimed in claim 26, wherein the means for holding includes a spring and clamp disks, and wherein the assembling includes the step of guiding the spring in a force-controlled manner onto the mounting pins by interaction of clamp disks with the spring.

* * * * *